United States Patent [19]

Matveev et al.

[11] 4,095,967
[45] Jun. 20, 1978

[54] METHOD OF MANUFACTURING GLASS FITTINGS WITH SIDE CHANNEL

[76] Inventors: Felix Arkadievich Matveev, ulitsa Petrozavodskaya, 21, kv. 140; Anatoly Nikolaevich Orlov, ulitsa Vavilova, 89, kv. 24; Anatoly Alexeevich Rudakov, Altaiskaya ulitsa, 18, kv. 13; Vladimir Sergeevich Chikmarev, Kashirskoe shosse, 132, korpus 3, kv. 310, all of Moscow, U.S.S.R.

[21] Appl. No.: 734,433

[22] Filed: Oct. 21, 1976

[51] Int. Cl.² ........................ C03B 9/14; C03B 11/00
[52] U.S. Cl. ........................................ 65/77; 65/78; 65/315; 65/320; 65/321
[58] Field of Search ............... 65/77, 78, 315, 320, 65/321

[56] References Cited

U.S. PATENT DOCUMENTS

| 281,610 | /1883 | Brunt | 65/315 |
| 1,603,025 | 10/1926 | Clarke | 65/77 X |
| 2,055,884 | 9/1936 | Theier | 65/315 X |
| 3,185,558 | 5/1965 | Wilcock | 65/77 X |

FOREIGN PATENT DOCUMENTS

| 20,421 of | 1890 | United Kingdom | 65/315 |
| 648,616 | 1/1951 | United Kingdom | 65/315 |

Primary Examiner—Richard V. Fisher
Assistant Examiner—Frank W. Miga
Attorney, Agent, or Firm—Holman & Stern

[57] ABSTRACT

A method wherein the material for manufacturing the fitting is supplied into the mold to the point of intersection of its side channels which are arranged substantially horizontally, and pressing is performed simultaneously in all of the above channels of the mold.

2 Claims, 2 Drawing Figures

METHOD OF MANUFACTURING GLASS FITTINGS WITH SIDE CHANNEL

BACKGROUND OF THE INVENTION

The present invention relates to the manufacture of glass fittings, and more particularly to methods of manufacturing glass fittings with side channels.

Such fittings can be used in various branches of industry and agriculture, wherein glass pipelines are used.

At the present time, fittings for glass pipelines are manufactured by three methods:

1. Blowing in a split mold.
2. Welding of separate pipe segments (gas welding or, less often, electrical welding).
3. Profile bending of a preheated rectilinear pipe blank.

The first process is manual, while the second and the third are mechanized.

Two types of pipes and shaped pieces for glass pipelines are manufactured: with flat edges and with beads.

In manufacturing fittings according to the second and third methods, manufacturers fabricate the pipes, cut them into measured segments, heat and weld these segments to one another, anneal them, and cut the ends of the side channels to size.

Manufacturing of fittings with beads involves the following additional operations: pressing off the beads, annealing them and removing the treatment allowance, heating the fitting and the beads, welding the beads to the branch pipes of the fitting, annealing the whole article with the beads, and grinding the end faces of the side channel.

These operations are additional to those normally involved in all the three methods mentioned above.

About 15 operations are required to manufacture fittings with beads.

All these three methods involve a high percentage of rejects at all process steps, as well as during hydraulic impact and thermal resistance tests.

There are also known other methods of manufacturing glass fittings. Thus, for example, a method has been tested of pressing T-bends with a movable vertical plunger and a fixed horizontal one. In this method, the molten glass being molded travels all the way along intricate paths of different length, whereby part of the molten glass intended for molding of a side branch pipe prematurely solidifies.

Also known is a method of molding glass fittings with side channels for branch pipes, wherein the molding of the coaxial channels is achieved by pressing with a vertically moving plunger provided with a following-and-retracting bottom plate, while the side channels are made by vacuum molding with subsequent blowing with compressed air from within through the cavity in the moving plunger die.

These methods are carried out with a mold wherein at least one of the channels is a vertical one.

The above methods have not found industrial application due to the fact that the combination of pressing, vacuum molding and blow molding of the rapidly cooling molten glass being molded in different positions in the mold has failed to provide for the required geometrical configuration of the articles.

The articles were undermolded, oval in shape, misaligned, differing in wall thickness, etc. In addition to the above disadvantages, the currently used methods of manufacturing glass fittings are also deficient in the following: multistep process, wide dimensional variations, formation of folds and considerable difference in the wall thickness after profile bending, gas bubbles in the welded seams, appearance of heavy stresses in various parts of an article during welding, necessity of grinding the end faces due to the axial misalignment of the side channels and perpendicular misalignment of the end faces, additional operations of making beads and welding them to the end faces of the side channels of the fittings with subsequent additional annealing, etc.

Thus, the above methods involve too many process steps and a great number of manual operations with low output of quality products and, consequently, high unit cost of manufacture.

OBJECTS AND SUMMARY OF THE INVENTION

The principal object of the present invention is to provide a method of manufacturing glass fittings with side channels, which enables production of articles of precise geometrical configuration without random stresses.

Another object of the present invention is to minimize manual labour in the production of glass fittings.

Still another object of the invention is to improve the quality of the manufactured articles.

Yet another object of the invention is to increase the process efficiency.

These and other objects are attained in a method of manufacturing glass fittings with side channels, wherein the material for making a fitting is fed into a mold and pressed therein, in accordance with the invention, the side channels of the mold are arranged substantially horizontally, the material for making the fitting is fed into the mold, to the point of intersection of its side channels, and the pressing is performed simultaneously in all the channels of the mold.

The present invention resides in the following.

The process according to the proposed method is based on making use of the mechanical and physical properties of the molten glass. In the course of molding, the viscosity of the molten glass should be of a specific value, while the flow of the molten glass must be in the isothermal state.

This can be achieved by minimizing the distance between where the gob of molten glass supplied into the mold and to the point of intersection of its side channels.

The substantially horizontal position of the side channels of the mold also ensures equal conditions for molding of the fitting branch pipes. The delivery of the material molten glass into the intersection point of the side channels of the mold enables simultaneous pressing in all of the channels of the mold. The pressing mechanisms (plungers) simultaneously travel to the center of the mold and treat the molten glass gob by exposing it to molding, while the value of the specific pressure from all of the pressing sides is the same.

This ensures production of high quality articles, as well as manufacturing of fittings with beads directly in the process of molding.

BRIEF DESCRIPTION OF THE DRAWINGS

The method is accomplished by means of a device shown in FIG. 1 and FIG. 2.

DETAILED DESCRIPTION OF THE INVENTION

Figure 1:
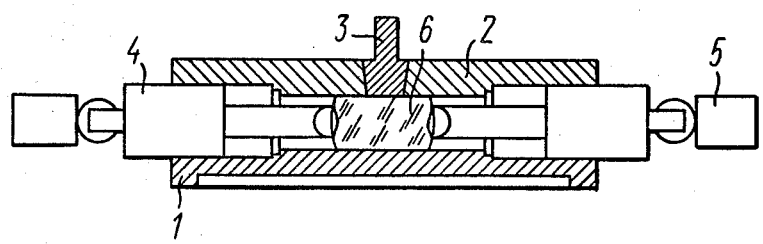
FIG. 1 is a side view of the device (the beginning of pressing)
Figure 2:
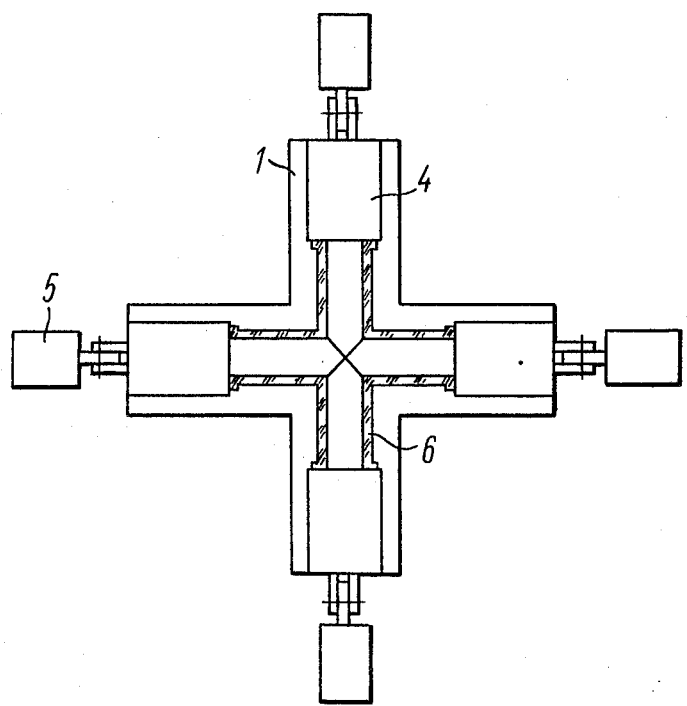
FIG. 2 is a plan view of the device (the end of pressing).

FIGS. 1 and 2 show a glass mold comprising a bottom half-mold 1 and a top half-mold 2. The top half-mold 2 is provided with an opening for delivery of the molten glass into the mold closed with a cover 3. The glass mold means comprises four plungers 4 provided with drives 5.

Given below are examples of specific embodiments of the present invention.

EXAMPLE 1.

The process of manufacturing a fitting, namely, a crosspipe is carried out in the following manner.

A portion of the molten glass mass 6 is supplied through an opening into the mold in the point of intersection of the side channels of the mold, while the plungers 4 are disengaged. The opening is closed with the cover 3 and the plungers 4 are set simultaneously in motion until they meet in the center of the mold as shown in FIG. 2.

The molten glass mass 6 extruded with the plungers 4 fills in the gaps between the plungers and the internal walls of the mold channels in all directions simultaneously, thus molding the article. The article is taken from the mold and introduced into an annealing furnace for relaxation of the residual stresses.

The manufactured fitting, a cross-pipe, is subjected to hydraulic impact and structural tests. The tests have shown that the strength of fittings manufactured according to the proposed method increased 1.5 to 2 times in comparison with the strength of the fittings manufactured by gas or gas-electric welding. (The strength was measured where the welding seams are located).

EXAMPLE 2.

The process of manufacturing a fitting, an elbow bend, is carried out in the following manner.

To obtain an elbow bend in the above-described mold, two channels are to be sealed and two plungers should be modified. The molten glass 6 is supplied through the opening into the mold to the point of intersection of the side channels of the mold while the plunger dies 4 are disengaged, upon which the opening is closed with the cover 3 and the plunger dies are set simultaneously in motion until they meet in the center of the mold.

The molten glass 6 extruded with the plungers 4 fills in the gaps between the plungers and the internal walls of the mold channels in all directions simultaneously.

The article is then taken from the mold and introduced into an annealing furnace for relaxation of the residual stresses.

The manufactured fitting, elbow bend, is subjected to hydraulic impact and structural tests. The tests have shown that the strength of fittings manufactured according to the proposed method increased 1.5 to 2 times in comparison with the strength of fittings manufactured by gas or gas-electric welding. (The strength was measured at the welding seams).

The present method eliminates manual labor, increases considerably the labor efficiency, combines the operations of molding the fitting and the beads on the ends of its branch pipes, eliminates the rejects in all the technological operations and, consequently, improves the quality of the manufactured articles, and increases the output.

What is claimed is:

1. In a method for manufacturing glass fittings comprising supplying a molten material to a mold, said mold having a charging opening and a plurality of side channels corresponding to the fitting to be manufactured, said side channels meeting at a center of intersection; pressing said molten material in said mold with at least one movable plunger at least partially disposed within said mold to form said fitting; and removing said fitting from said mold; the improvement wherein all of said side channels are arranged substantially horizontally, said charging opening is disposed at said center of intersection, each side channel is provided with a movable plunger, and said pressing is performed simultaneously by all of said plungers in all of said side channels.

2. The method of claim 1 wherein said molten material is glass.

* * * * *